US011577830B2

(12) United States Patent
Fauri (10) Patent No.: US 11,577,830 B2
(45) Date of Patent: Feb. 14, 2023

(54) AIRCRAFT

(71) Applicant: Dr. Ing. h.c. F. Porsche Aktiengesellschaft, Stuttgart (DE)

(72) Inventor: Mikel Fauri, Ludwigsburg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 646 days.

(21) Appl. No.: 16/543,687

(22) Filed: Aug. 19, 2019

(65) Prior Publication Data

US 2020/0122829 A1  Apr. 23, 2020

(30) Foreign Application Priority Data

Aug. 20, 2018 (DE) .......................... 102018120198.2

(51) Int. Cl.
| | |
|---|---|
| B64C 29/00 | (2006.01) |
| B64C 29/02 | (2006.01) |
| B64C 39/02 | (2006.01) |
| B64D 27/24 | (2006.01) |
| B64D 27/02 | (2006.01) |

(52) U.S. Cl.
CPC ...... *B64C 29/0033* (2013.01); *B64C 29/0025* (2013.01); *B64C 29/02* (2013.01); *B64C 39/024* (2013.01); *B64C 2201/021* (2013.01); *B64C 2201/066* (2013.01); *B64C 2201/088* (2013.01); *B64C 2201/108* (2013.01); *B64C 2201/162* (2013.01); *B64D 27/24* (2013.01); *B64D 2027/026* (2013.01)

(58) Field of Classification Search
CPC .................... B64C 2201/141; B64C 2201/145

USPC ........................................................ 244/181
See application file for complete search history.

(56) References Cited

U.S. PATENT DOCUMENTS

| | | | |
|---|---|---|---|
| RE28,762 E | 4/1976 | Toman | |
| 5,716,032 A * | 2/1998 | McIngvale | G05D 1/0676 244/187 |
| 6,278,460 B1 * | 8/2001 | Myers | G06T 15/06 382/154 |
| 6,311,108 B1 * | 10/2001 | Ammar | G01S 13/913 701/16 |
| 6,469,654 B1 | 10/2002 | Winner et al. | |
| 6,546,118 B1 * | 4/2003 | Iisaka | G06V 20/588 382/104 |
| 6,694,228 B2 * | 2/2004 | Rios | G05D 1/0044 701/28 |
| 6,857,601 B2 * | 2/2005 | Akahori | G08G 5/0052 244/30 |

(Continued)

FOREIGN PATENT DOCUMENTS

| | | |
|---|---|---|
| AT | 515456 A1 | 9/2015 |
| CN | 103369618 A | 10/2013 |

(Continued)

OTHER PUBLICATIONS

Chinese Office Action for Chinese Application No. 201910767663.9, dated Aug. 29, 2022 with Search Report, 10 pages.

*Primary Examiner* — Christopher P Ellis
(74) *Attorney, Agent, or Firm* — RatnerPrestia (57) ABSTRACT

An aircraft includes a short-range radar that is configured to detect a trajectory, which is specified based on a position detection of the aircraft by a ground station.

6 Claims, 6 Drawing Sheets

(56) References Cited

U.S. PATENT DOCUMENTS

| | | | | |
|---|---|---|---|---|
| 7,228,232 | B2* | 6/2007 | Bodin | G05D 1/0044 701/2 |
| 7,286,913 | B2* | 10/2007 | Bodin | G05D 1/0044 701/2 |
| 7,373,242 | B2* | 5/2008 | Yamane | G05D 1/0858 701/4 |
| 7,400,950 | B2* | 7/2008 | Reich | G05D 1/0858 701/4 |
| 7,512,462 | B2* | 3/2009 | Nichols | G01C 21/20 701/3 |
| 7,676,304 | B2* | 3/2010 | Colich | G08G 5/006 701/8 |
| 8,112,188 | B2* | 2/2012 | Rouquette | G08G 5/0021 340/948 |
| 9,595,198 | B2* | 3/2017 | Limbaugh | B64C 39/024 |
| 9,632,509 | B1* | 4/2017 | Aphek | G05D 1/102 |
| 9,738,399 | B2* | 8/2017 | Lee | B64D 45/04 |
| 9,807,670 | B2 | 10/2017 | Vermande et al. | |
| 9,990,684 | B2* | 6/2018 | Hejazi | G06Q 50/32 |
| 10,101,748 | B2* | 10/2018 | Wang | G05D 1/0011 |
| 10,240,930 | B2* | 3/2019 | Zhou | G01S 19/49 |
| 10,338,594 | B2* | 7/2019 | Long | B60W 30/00 |
| 10,409,293 | B1* | 9/2019 | Pounds | G01S 13/867 |
| 10,429,839 | B2* | 10/2019 | Liu | G05D 1/0088 |
| 10,430,653 | B2* | 10/2019 | Malecki | G05D 1/0206 |
| 10,793,258 | B2* | 10/2020 | Lin | B64C 39/024 |
| 10,944,998 | B2* | 3/2021 | Zhang | H04N 21/47202 |
| 11,126,201 | B2* | 9/2021 | Rozenberg | G06V 10/42 |
| 11,307,584 | B2* | 4/2022 | Jobanputra | G06F 8/20 |
| 11,393,342 | B1* | 7/2022 | Moeykens | G08G 5/0034 |
| 11,414,209 | B2* | 8/2022 | Schonfelder | B64F 1/04 |
| 2010/0224721 | A1 | 9/2010 | Wood et al. | |
| 2012/0209457 | A1* | 8/2012 | Bushnell | G08G 5/045 701/4 |
| 2017/0057630 | A1 | 3/2017 | Schwaiger | |
| 2017/0197711 | A1 | 7/2017 | King et al. | |
| 2017/0345317 | A1* | 11/2017 | Heinonen | G01C 21/20 |
| 2018/0009546 | A1 | 1/2018 | Filias et al. | |
| 2018/0096611 | A1* | 4/2018 | Kikuchi | B64D 45/04 |
| 2019/0066524 | A1* | 2/2019 | Zhang | B64D 47/08 |
| 2019/0077510 | A1* | 3/2019 | Panas | H02S 40/38 |
| 2019/0369646 | A1* | 12/2019 | Bosworth | G01P 1/127 |
| 2020/0012296 | A1* | 1/2020 | Gurdan | B64F 1/22 |
| 2020/0189731 | A1* | 6/2020 | Mistry | H04B 7/18502 |
| 2020/0225684 | A1* | 7/2020 | Anderson | B64C 39/024 |
| 2021/0350716 | A1* | 11/2021 | Gariel | G08G 5/0078 |

FOREIGN PATENT DOCUMENTS

| | | | | |
|---|---|---|---|---|
| CN | 105438443 | A | | 3/2016 |
| CN | 106133674 | A | | 11/2016 |
| CN | 108885461 | A * | 11/2018 | ............ G05D 1/106 |
| CN | 107250882 | B * | 12/2020 | ......... G02B 27/0093 |
| CN | 109987226 | B * | 1/2021 | ............ B64C 39/024 |
| CN | 106068592 | B * | 6/2021 | ............ B60L 53/14 |
| DE | 60106446 | T2 | | 2/2006 |
| DE | 102018218715 | A1 * | 4/2020 | ........... G08G 5/0069 |
| EP | 2533068 | A1 * | 12/2012 | ........... G01S 5/0247 |
| EP | 3336577 | A1 * | 6/2018 | ............ B64D 45/00 |
| ES | 2760352 | T3 * | 5/2020 | ......... H04B 7/18506 |
| ES | 2780369 | T3 * | 8/2020 | ............ G05D 1/101 |
| JP | 2017136879 | A | | 8/2017 |
| JP | 2021536599 | A * | 12/2021 | |
| RU | 2760828 | C1 * | 11/2021 | |
| RU | 2762151 | C2 * | 12/2021 | ........... G01S 13/867 |
| WO | WO-8907304 | A1 * | 8/1989 | |
| WO | WO-2017068224 | A1 * | 4/2017 | ............ A01M 29/00 |

* cited by examiner

AIRCRAFT

CROSS-REFERENCE TO RELATED APPLICATION

This application claims priority to German Patent Application No. 10 2018 120 198.2, filed Aug. 20, 2018, the content of such application being incorporated by reference herein in its entirety.

FIELD OF THE INVENTION

The present invention relates to an aircraft, in particular an all-electric vertical take-off and landing (VTOL) aircraft.

BACKGROUND OF THE INVENTION

In aerospace technology, VTOL refers to any type of aircraft, drone or rocket that has the ability to take off and land again in an essentially vertical manner and without a take-off and landing runway. This collective term is subsequently used in a broad sense, which includes not only rigid-wing aircraft with wings, but also rotary wing aircraft, such as helicopters, gyrocopters, gyrodynes and hybrids such as compound helicopters or combination helicopters, as well as convertiplanes. Furthermore, this includes aircraft with the ability to take off and land at particularly short distances (short take-off and landing, STOL), to take off at short distances, but to land vertically (short take-off and vertical landing, STOVL) or to take off vertically, but to land horizontally (vertical take-off and horizontal landing, VTHL).

U.S. Pat. No. 5,716,032 A, which is incorporated by reference herein, describes an automatic landing system for driving an unmanned aircraft along a predetermined path to a predetermined point on the ground. The system contains an image processing device in a motion compensation processor that calculates aircraft parameters. These calculations are based on the movement of elements in the video of an imaging sensor on board the aircraft. The motion compensation processor also measures the distance between two beacons that are a known distance from each other on each side of the apparent impact point. A recovery control processor on the ground calculates commands for the autopilot that corrects the aircraft's trajectory. The video image can either be transmitted via a data connection to the ground station or the image processing can be carried out on board the aircraft.

A precision aircraft landing system in accordance with DE 60 106 446 T2, which is incorporated by reference herein, determines the location of the aircraft in real time by measuring an elapsed time between a query and transponder response signal at a plurality of predetermined locations. The system achieves accurate aircraft positioning by measuring the transponder-response-difference phase to calculate an approach angle.

The approach according to aspects of the invention is based on the knowledge that vertical landings should be performed on small and densely modified landing sites on a precisely predetermined trajectory in order to prevent collisions with or disturbances from other users, vehicles, pedestrians, etc.

The proposed approach also takes into account the fact that high-precision on-board systems for spatial location and understanding of the situation are usually complex and expensive.

Finally, the invention is based on the insight that the correct approach towards certain landing sites, such as helipads, should be well known, and it is therefore not necessary for every approaching aircraft to acquire this knowledge automatically. Instead, they only need to be told in a suitable way how to follow the prescribed trajectory.

SUMMARY OF THE INVENTION

Described herein is an aircraft, in particular an all-electric aircraft, in the above sense vertical take-off and landing aircraft.

One advantage of this radar-based detection system is that it can even be used under unfavorable visual conditions, thereby utilizing simple predefined signs and symbols.

Other favorable embodiments of the invention are indicated within the dependent patent claims. For example, the aircraft can thus be equipped with bent or even optionally bendable wings. A corresponding variant increases the wing surface, which is effective during horizontal flight, but without extending the floor space of the aircraft.

In addition, the aircraft may have a fast-charging battery system that provides the propulsion energy for vertical take-off and landing as well as horizontal flight and allows for short-term stationary charging of the aircraft.

Instead of free-wheeling rotors, a plurality of ducted fans also with different sizes can be used to propel the aircraft, as known for example away from aviation technology, such as in hovercraft or airboats. The cylindrical housing surrounding the propeller is able to significantly reduce the thrust losses due to turbulence at the blade tips in such an embodiment. Suitable ducted fans may be horizontally or vertically aligned, pivotable between both positions or covered by louvers for aerodynamic reasons during horizontal flight. In addition, a pure horizontal thrust generation by means of fixed ducted fans is conceivable.

Finally, in addition to a preferably fully autonomous operation of the aircraft, if sufficiently qualified, granting of manual control to a human pilot is also possible, which provides the device according to aspects of the invention with the greatest possible handling flexibility.

BRIEF DESCRIPTION OF THE DRAWING

An exemplary embodiment of the invention is illustrated in the drawing and will be described in greater detail in the following.

DETAILED DESCRIPTION OF THE INVENTION

Figure 1A:
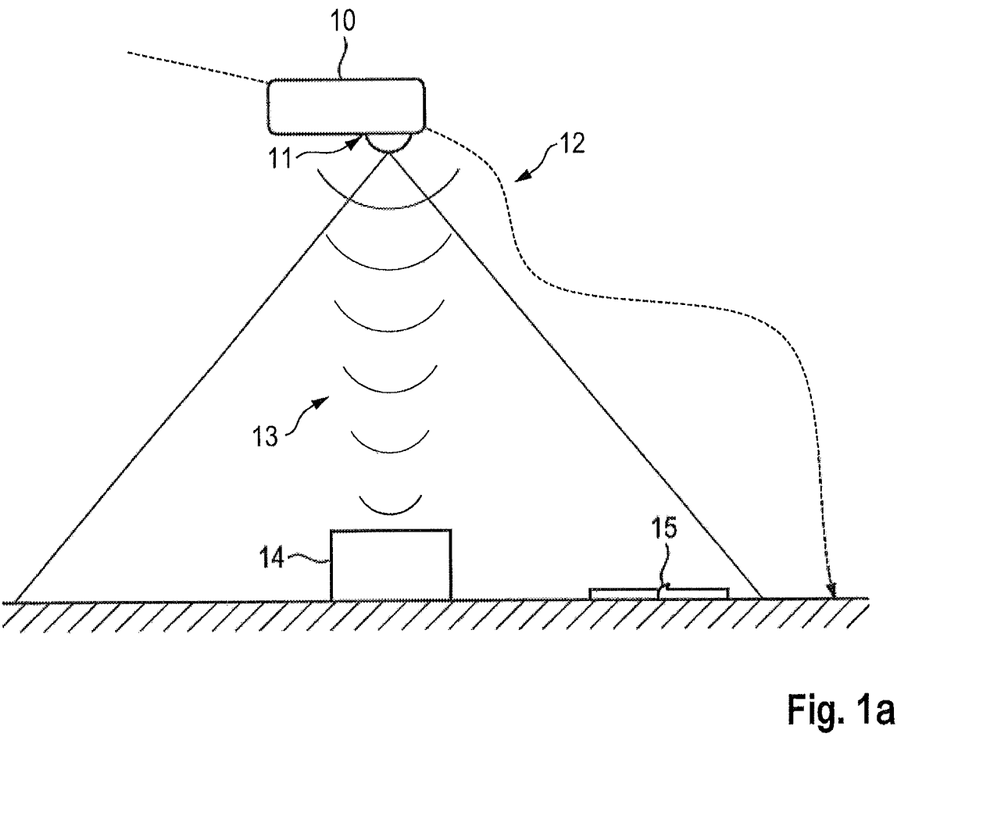
FIG. 1a is a schematic view depicting an aircraft and a ground display.
Figure 1B:
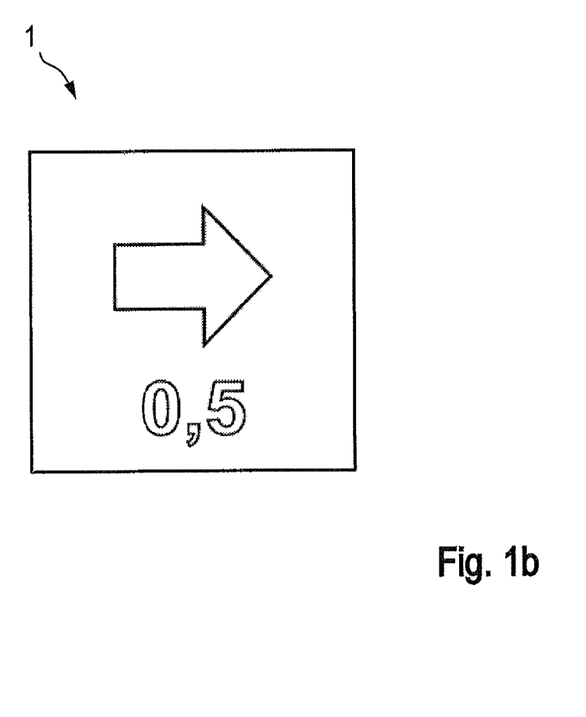
FIG. 1b shows a ferroelectric liquid display.

FIGS. 1a and 1b illustrate the constructive features of a preferred embodiment of the aircraft of the invention. The system in the aircraft (10) comprises a ground-oriented short-range radar (11) and a simple detection software that interprets predefined symbols and signs, which, in turn, are read on the basis of the reflection of the radio waves from a ferroelectric liquid display (15). Further details of the aircraft (10) are disclosed in U.S. application Ser. No. 16/502, 315, which is incorporated by reference herein in its entirety and for all purposes.

The ground station (14) in turn comprises a system for position detection (13), the combination of sensors of which allows an accurate reading of the position of the aircraft (10) relative to the ground station (14), the liquid display (15) used for guidance on the ground and appropriate control.

The ground station (14) position detection system (13) detects the relative position of the aircraft (10) in relation to the ground station (14) with a high level of accuracy. Such s a positioning system can be a combination of different sensors (camera, radar, lidar, etc.) that may be arranged differently to improve the accuracy of position detection (13). This sensor module does not have to be light or energy-saving and can therefore be manufactured in a cost-effective manner.

The control of the ground station (14) stores a predefined trajectory (12) for the approach. By comparing this trajectory (12) and the current position of the aircraft (10), the controller calculates the required movements of the aircraft (10) and their speeds to follow the trajectory (12). The respective direction of movement and its speed are shown on the liquid display (15) by corresponding directional arrows and numbers. The short-range radar (11) reads the said signs and numbers and transmits them to the autopilot, which correspondingly reacts.

Figure 2:
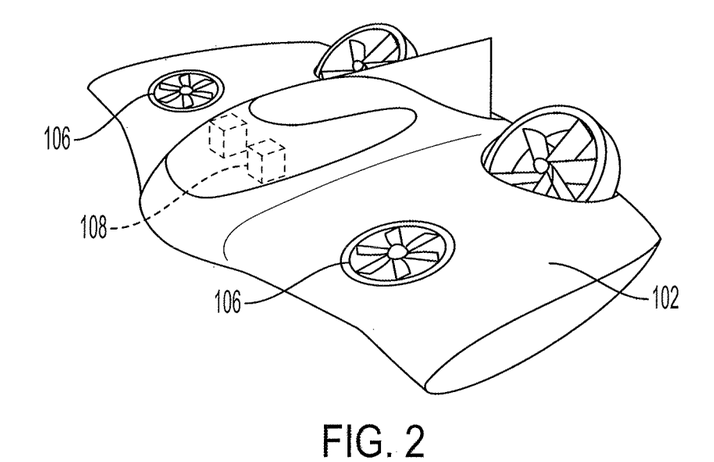
FIG. 2 depicts an isometric view of an aircraft, wherein the wings are shown in an extended configuration and the rear propellers are shown in an angled orientation.
Figure 3:
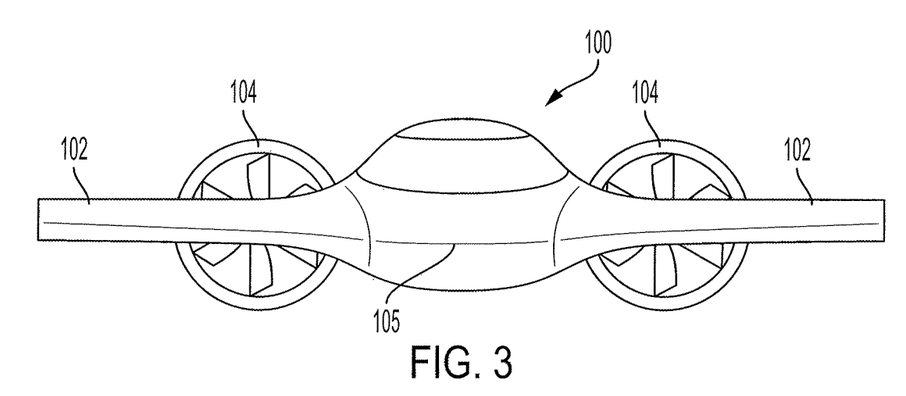
FIG. 3 depicts a front elevation view of the aircraft of FIG. 2, wherein the wings are shown extended configuration and the rear propellers are shown in a cruising orientation.
Figure 4:
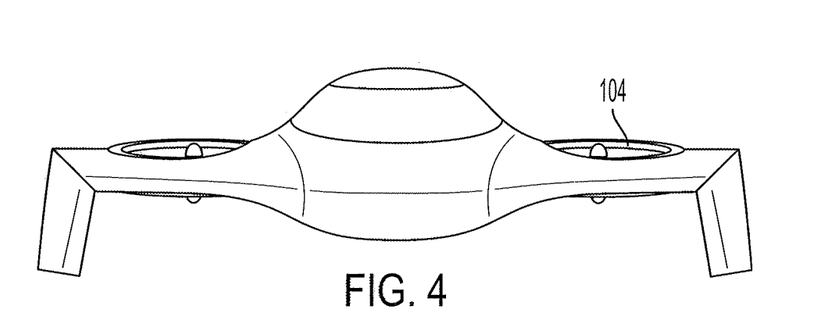
FIG. 4 depicts another front elevation view of the aircraft, wherein the wings are shown in a folded configuration and the rear propellers are shown in a take-off/landing orientation.

FIGS. 2-4 depict an aircraft 100. The aircraft 100 shown in those figures may appear different from the previously described aircraft, however, many (if not all) of the details of the previously described aircraft also apply to aircraft 100.

The aircraft 100 includes foldable wings 102. The wings 102 are shown in a folded configuration in FIG. 4 and an extended configuration in FIG. 3. A motor or solenoid is configured to move the wings between those configurations. Alternatively, the wings 102 may be permanently maintained in a folded (i.e., bent) position.

Rear propellers 104 are mounted on the trailing edge of the airfoils or wings 102 (i.e., the edge furthest from the nose 105). Propellers 104 may be referred to as cruising propellers because they are used during the cruising operation of the aircraft (at least in one position of the propellers 104). The propellers 104 are configured to pivot between two different positions, as shown in FIGS. 2-4. In the vertical position of the propellers 104 shown in FIG. 3, the propellers 104 generate maximum horizontal thrust for cruising operation of the aircraft (i.e., while the aircraft is flying through the air). In the horizontal position of the propellers 104 shown in FIG. 4, the propellers 104 generate maximum vertical thrust for take-off and landing operations of the aircraft. A motor or solenoid is configured to move the propellers 104 between those two positions.

Alternatively, the propellers 104 may be immovable and fixed in a vertical position, as shown in FIG. 2.

Horizontally mounted propellers 106 are fixedly mounted and integrated into the wings 102. Unlike the propellers 104, the position of the propellers 106 is fixed, however, those skilled in the art will recognize that the propellers 106 could be modified so that they are pivotable between vertical and horizontal positions. The propellers 106 generate maximum vertical thrust for take-off and landing operations of the aircraft. The propellers 106 may also be referred to herein as lifting propellers.

The propellers 104 and 106, which may also be referred to herein as fans, may be operated by a fully-electric drive. To that end, a battery charging system 108 including a charger, an inverter and a fast-charging battery are positioned within the fuselage of the aircraft for powering the propellers 104 and 106. The fuselage may also be configured to carry one or more passengers.

Figure 5:
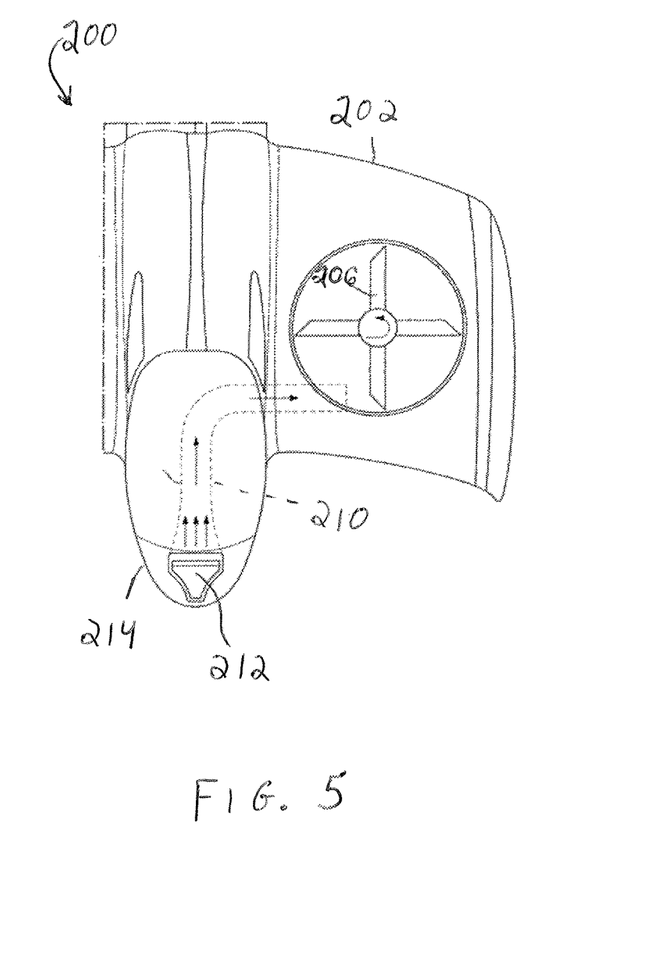
FIG. 5 depicts a top plan view of a portion of an aircraft, showing an internal duct extending between a nose of the aircraft and a horizontal fan mounted to the wing.
Figure 6:
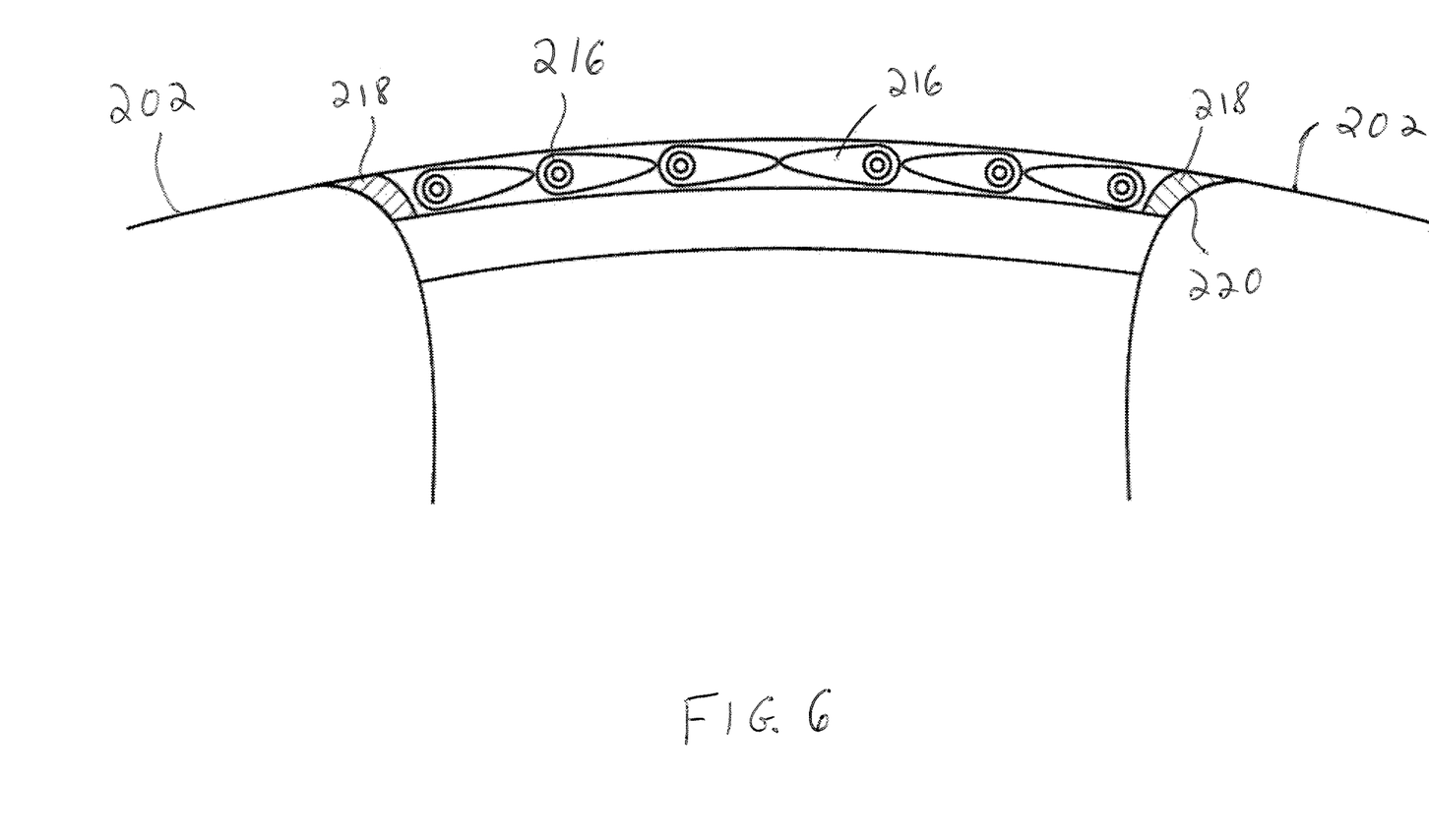
FIG. 6 depicts moveable louvers applied on top of the horizontal fan of FIG. 5, wherein the louvers are shown in a closed position.
Figure 7:
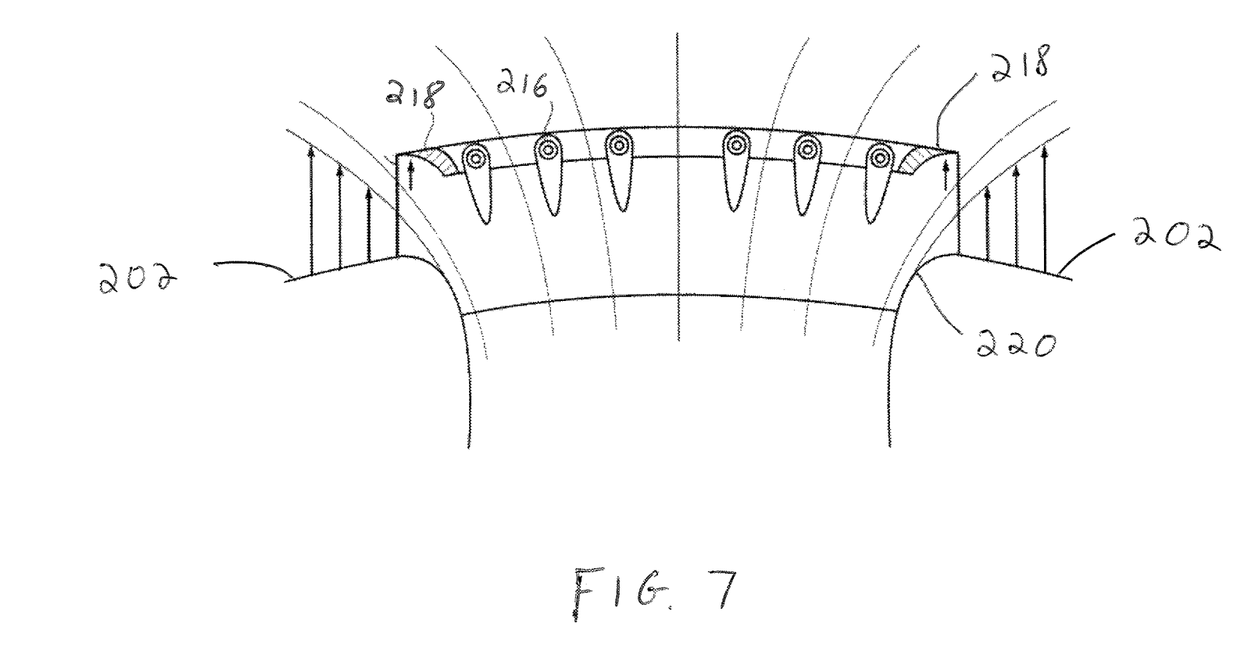
FIG. 7 depicts the movable louvers of FIG. 6, wherein the louvers are shown in an open position.

FIGS. 5-7 depict views of an aircraft 200. The aircraft 200 shown in those figures may appear different from the previously described aircraft 100, however, most (if not all) of the details of the previously described aircraft 100 also apply to aircraft 200. Only a segment of the aircraft 200 is shown in FIG. 5. An air duct 210 extends between an opening 212 formed on the nose 214 of the aircraft 200 and the horizontally mounted propeller 206 that is fixedly mounted to the wing 202. In operation, air is delivered to the propeller 206 via the duct 210, as depicts by the arrows. Although not shown, air ducts that are similar to duct 210, may extend to the propeller 206 on the opposite wing 202, as well as any rear propellers 104 (not shown in these views). Accordingly, the propellers may be referred to as either "ducted propellers" or "ducted fans."

FIGS. 6 and 7 depict louvers 216 that are configured to selectively cover the horizontally mounted propellers 206. It is noted that the louvers 216 are omitted from FIG. 5 for clarity purposes. Each louver 216 is rotatable about a shaft (or otherwise moveable) between a closed position (FIG. 6) and an open position (FIG. 7). The louvers 216, which are flush with the top face of the wing 202, may be moved to the closed position during the cruising operation of the aircraft 200 for aerodynamic purposes. The louvers 216 may be moved to an open position at any time during operation of the propellers 206 to permit the exit or entrance of air therethrough. A motor or solenoid is configured to move the louvers 216 between those positions. It is noted that the louvers are shown in a closed position in FIG. 2.

A sealing ring 218 surrounds the louvers 216 and is moveable between a retracted position (FIG. 6) and a deployed position (FIG. 7). The louvers 216 are mounted to the sealing ring 218 and move therewith between the retracted and deployed positions. The lower surface of the sealing ring 218 is configured to be in sealing relationship with an opening 220 formed in the wing 202. It should be understood that the opening 220 accommodates the body of the propeller 206. The sealing ring 218 may be moved to the retracted position, which is flush with the top face of the wing 202, during cruising operation of the aircraft 200 for aerodynamic purposes. Alternatively, the sealing ring 218 may be moved to the deployed (i.e., extended) position at any time during operation of the propellers 206 to permit the exit or entrance of air, as depicted by the arrows in FIG. 7. A motor or solenoid is configured to move the sealing ring 218 between those positions.

What is claimed is:

1. An aircraft comprising:
a short-range radar device that detects a landing trajectory for the aircraft, which is specified on the basis of a position detection of the aircraft by a ground station; and
detection software of the short-range radar device that interprets symbols transmitted by the ground station, said symbols representing a direction of movement and speed for landing the aircraft,
wherein the landing trajectory for the aircraft is determined based upon the symbols interpreted by the detection software.

2. The aircraft as claimed in claim 1, wherein the short-range radar device is configured to read the symbols from a ferroelectric liquid display, and the trajectory is specified by the ferroelectric liquid display.

3. The aircraft as claimed in claim 1, wherein the aircraft comprises an all-electric drive.

4. The aircraft as claimed in claim 1, wherein the aircraft comprises either bent or bendable wings.

5. The aircraft as claimed in claim 1, wherein the aircraft includes a fast-charging battery system.

6. The aircraft as claimed in claim 1, wherein the aircraft further comprises autopilot software that is configured to determine the landing trajectory for the aircraft based upon the symbols interpreted by the detection software, and guide the aircraft along the landing trajectory.

* * * * *